United States Patent [19]

Zeilon

[11] 4,154,140

[45] May 15, 1979

[54] EXPANSION SHIELD FOR ANCHORING A SCREW OR A BOLT IN A HOLE IN MASONRY, CONCRETE OR STONE, AND A TOOL FOR INSERTING A SHIELD

[75] Inventor: Sten Zeilon, Glumslöv, Sweden

[73] Assignee: Arbman Development AB, Stockholm, Sweden

[21] Appl. No.: 552,817

[22] Filed: Feb. 25, 1975

Related U.S. Application Data

[63] Continuation of Ser. No. 300,560, Oct. 20, 1972, abandoned.

[30] Foreign Application Priority Data

Oct. 22, 1971 [SE] Sweden .............................. 13429/71

[51] Int. Cl.² ............................................ F16B 13/04
[52] U.S. Cl. ......................................... 85/64; 29/227
[58] Field of Search .................... 85/63, 64, 82, 83, 85, 85/64, 32 CS; 29/227; 113/116 H

[56] References Cited

U.S. PATENT DOCUMENTS

| 1,005,630 | 10/1911 | Fleming | 85/64 |
| 2,842,999 | 7/1958 | Huston | 85/64 |
| 3,136,202 | 6/1964 | Wagner | 85/85 |

FOREIGN PATENT DOCUMENTS

| 2108737 | 12/1971 | Fed. Rep. of Germany | 85/64 |
| 7001935 | 7/1935 | France | 85/85 |
| 179144 | 3/1922 | United Kingdom | 85/64 |

*Primary Examiner*—Ramon S. Britts
*Attorney, Agent, or Firm*—Sughrue, Rothwell, Mion, Zinn and Macpeak

[57] ABSTRACT

An expansion shield for anchoring a machine screw or bolt in a hole in masonry, concrete or stone comprises a strip-like blank of sheet helically wound around a shaft. One turn of the shield overlaps a previous turn. The blank in one end has an inwardly bent engagement portion. A method of producing such an expansion shield comprises winding with overlap a strip-like blank of sheet to helical shape on a rotatable and axially displaceable winding shaft which forms an acute angle with the feeding direction of the blank. A tool or an apparatus for producing the shield is also disclosed.

1 Claim, 5 Drawing Figures

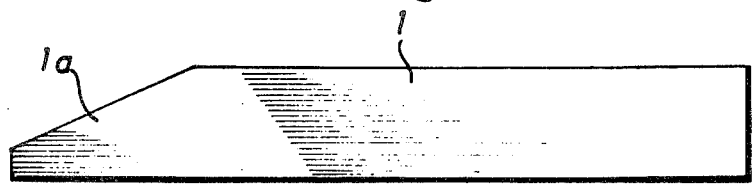
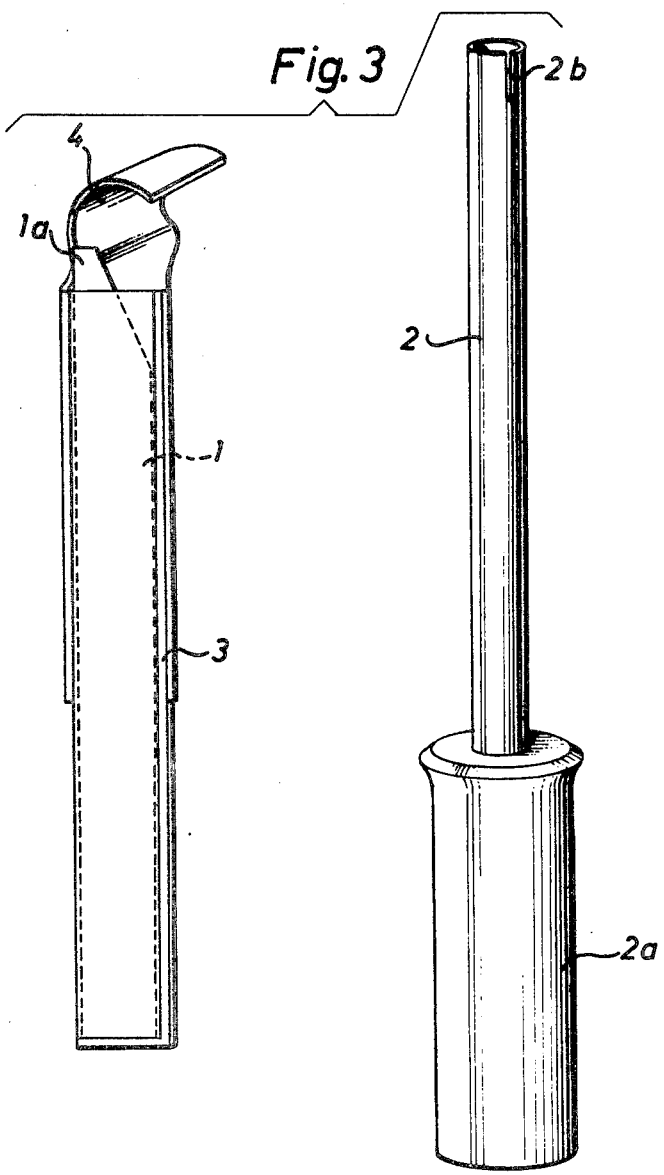
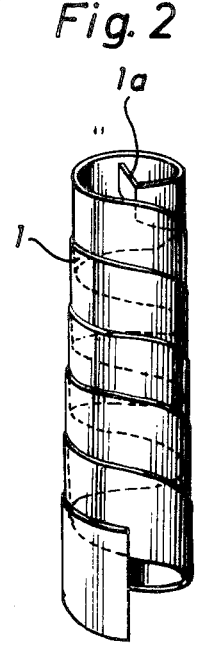

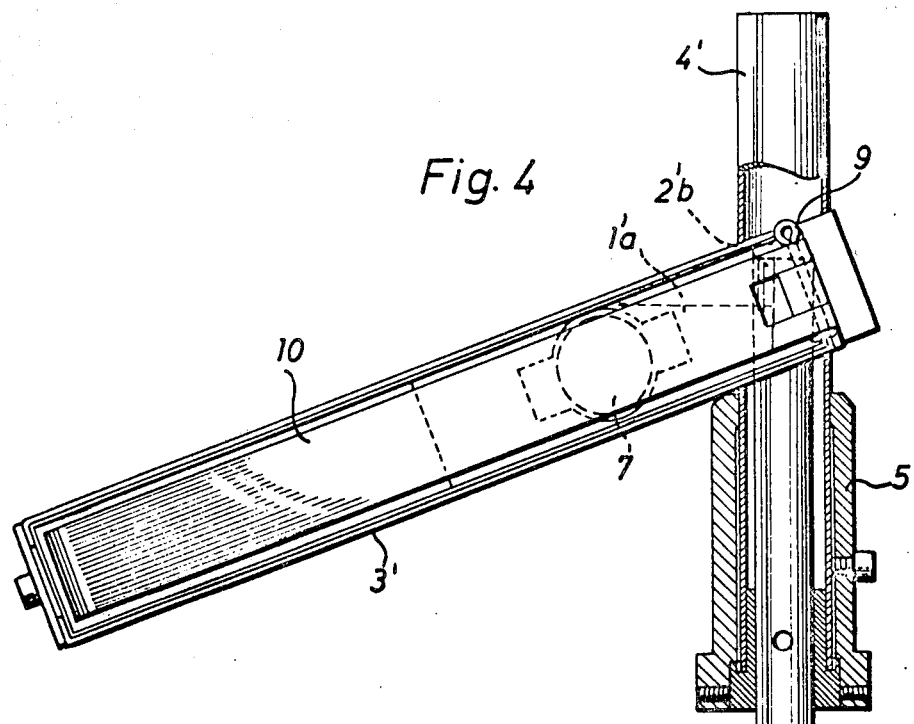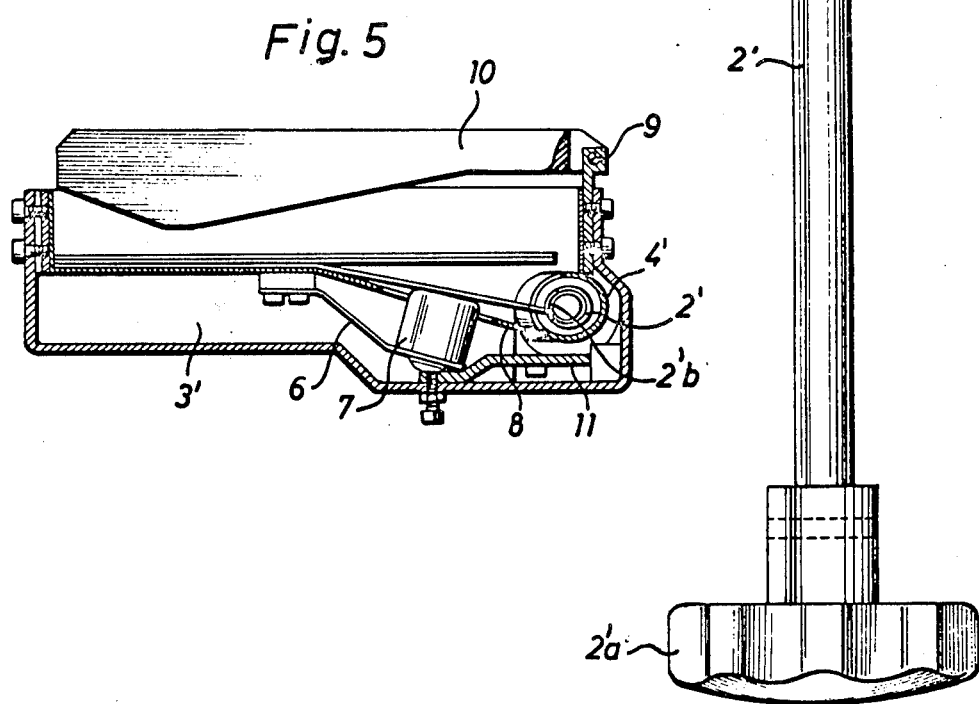

EXPANSION SHIELD FOR ANCHORING A SCREW OR A BOLT IN A HOLE IN MASONRY, CONCRETE OR STONE, AND A TOOL FOR INSERTING A SHIELD

This application is a continuation of application Ser. No. 300,560 filed Oct. 20, 1972, now abandoned.

The present invention refers to an expansion shield for anchoring a screw or a bolt in a hole in masonry, concrete or stone by the screw or bolt by itself forming threads in the shield, said shield comprising a strip-like blank of sheet helically wound around a shaft the width of the blank substantially exceeding its thickness and the length of the blank substantially exceeding its width.

There are previously known shields of this or similar kind which, however, either cannot in an acceptable way perform their intended function or require a complicated shape of the blank from which the shield is formed.

One object of the present invention is that starting from a blank having a simple form and by using an uncomplicated method of forming accomplish an expansion shield which with great reliability cooperates with a bolt or screw having constant threads (a so called machine screw).

An expansion shield according to the present invention which fulfils this object is mainly characterized in that one turn of the shield overlaps a previous turn.

Practical tests on shields formed according to the invention have shown that they permit transmitting of forces between the bolt and the stone material of the same magnitude as the bolt's own strength. The screw or the bolt forms by itself threads in the shield while simultaneously corrugating the inner side thereof, whereby the simultaneously outwardly pressed outer jacket portions of the shield are urged against the wall of the hole. The overlapping relationship between the shield windings produces a continuous surface of engagement, whereby great tension forces can be transmitted between the bolt and the wall of the hole. The shield is wound so that it expands when the bolt is turned to the right. Accordingly, the shaft on which the shield is wound shall be rotated in the opposite direction when the shield is manufactured.

The invention also refers to a method of producing a shield of the mentioned kind and a tool or an apparatus for manufacturing of shields according to the invention. Essential features of the method and the tool or apparatus are stated in the attached claims.

The invention is described more in detail hereinbelow with reference to the accompanying drawing.

FIG. 1 shows a strip-like blank of sheet intended for forming an expansion shield according to the invention.

FIG. 2 illustrates an expansion shield formed from the blank according to FIG. 1.

FIG. 3 is a perspective view of the two main parts of a simple tool for forming a shield according to the invention.

FIG. 4 is a sectional view of a somewhat more complicated tool or apparatus for the same purpose.

FIG. 5, finally, is a sectional view of a magazine belonging to the apparatus shown in FIG. 4.

So as to accomplish an expansion shield for anchoring a machine screw or bolt in a hole in masonry, concrete or stone there is used a blank 1 of metal sheet having the form of a strip. The blank comprises mainly the same width along the main portion of its length but emerges into a tapering end portion 1a intended to form an engagement portion at the forming of the shield in a tool described below.

In FIG. 2 there is shown a complete shield 1 produced by giving the strip-like blank a helical winding. A new turn of the strip overlaps a previous turn. When cooperating with a screw or bolt the complete expansion shield is substantially uniformly radially expanding along its length. Then it produces extraordinarily reliable anchoring of the screw or bolt whereby the shield presents minimal risk of being damaged in the stone material. The shield is with advantage inserted into holes having substantially the same diameter as the screw or bolt which is to be anchored thereby. The drilling work is, thus, as less as possible. Accordingly, the shield also offers the possibility of being pearcemounted. The shield has a winding corresponding to a left-hand thread.

In FIG. 3 there is shown a simple tool for forming a shield according to FIG. 2. The tool comprises two main parts, namely one winding shaft 2 having a handle 2a, and a magazine 3 for a number of blanks 1. On the magazine there is further a forming member 4 having a curved inner surface. At the outer end of the shaft 2 there is an engagement member in the form of a slit 2b adapted to engage the tapering portion 1a of a blank 1 so as to form a hook-like engagement portion which facilitates winding of the blank on the shaft.

The forming member 4 has a curved inner surface adapted partly to surround the shaft. When the shaft is inserted in the forming member it forms an acute angle with the longitudinal direction of the magazine. At rotation of the shaft 2 after engaging one blank 1 the latter is given helical form by winding it on the shaft between this and the forming member. The sides of the magazine guides the blank as it is withdrawn from the magazine and at the forming operation the shaft will be given an axial displacement movement. When the winding operation is ended the completed shield is situated on the shaft and can then directly be inserted into a desired hole. The shaft and/or the forming member are suitably replaceable mounted so as to cope with different hole sizes.

The tool can be designed so that the angle between the shaft and the magazine is adjustable. The slenderness of the shield can thereby be controlled and it can be easily adapted to different wear of the drill and different hardness of the stone material.

In FIGS. 4 and 5 there is shown a further embodiment of a tool or an apparatus for forming shields according to FIG. 2. The shaft 2' of this tool forms as in the previous embodiment an acute angle with a magazine 3' but cannot without special steps being taken be removed therefrom. The shaft 2' is surrounded by a cylindrical casing 5 to which is attached a tubular forming member 4' having somewhat greater inner diameter than the outer diameter of the shaft 2'. As is most evident from FIG. 5 the front end of the shaft 2' is provided with a slitted portion 2'b which forms an engagement member for strip-like blanks 1. In the magazine there is further a permanent magnet 7 attached to a spring 6, said magnet being covered by a nylon layer so as to reduce wear. The permanent magnet 7 cooperates with a spring-biased arm 8 so designed that when the slit 2'b takes a suitable position for inserting a blank the permanent magnet 7 is moved towards the adjacent blank whereby its tapering end portion 1a at rotation of the shaft 2' in one direction is fed into the slit 2'b and by being bent is provided with an engagement portion. At rotation of the shaft in the opposite direction helically winding of the blank between the shaft 2' and the surrounding forming member 4' is then initiated, whereby the shaft at the same time is given an axial displacement. When the winding of the shield is completed it can be directly inserted into the hole thereby that the forming member 4' is being positioned over the hole and the shaft 2' with the shield displaced into the hole. On the magazine there is an abutment member 10 pivoted around a shaft 9. When the magazine is being gripped said abutment member will urge the blanks 1 contained therein towards the permanent magnet 7. A spring denoted 11 permits adjustment of the biasing force of the spring 6 carrying the permanent magnet 7.

The tool or apparatus described is simple to handle and permits rapid forming and insertion of shields into desired holes.

An apparatus for the manufacturing in series of shields can comprise the same main portions as the tool or apparatus described above and be provided with a suitable drive means and a discharging mechanism. At the use of such premanufactured shields a special tool for the insertion thereof into the intended hole may be utilized. Such a tool suitably comprises a shaft or a pin provided with a slit or the like for cooperation with the inwardly bent engagement portion 1a of the shield.

The strip-like blank may possibly be provided with corrugations, cavities, perforations, certain pattern or the like so as to improve the anchoring capability of the complete shield. Such pattern or the like may possibly be produced by the tool at the winding operation.

What I claim is:

1. A system for anchoring a threaded member, such as a screw or bolt, in a hole formed in masonry, concrete or stone, comprising:
    (a) a self tapping threaded member having substantially the same diameter as the hole;
    (b) an expansion shield insertable into said hole, the inner surface engaging the threads of said threaded member, said expansion shield formed from a strip-like blank sheet helically wound around a shaft such that one turn partially overlaps a previous turn, the width of the blank substantially exceeding its thickness and the length of the blank substantially exceeding its width;
    (c) a radially inwardly protruding flange disposed only at one end of said shield;
    (d) a tool insertable in said shield to engage said protruding flange and radially contract the expansion shield to facilitate insertion into the hole;
    (e) said expansion shield expanding radially, when said threaded member is inserted and rotated, without substantial longitudinal contraction such that a continuous surface of engagement exists between the wall of the hole and the shield to thereby retain said threaded member within the hole.

* * * * *